Nov. 10, 1925.  
C. LE G. FORTESCUE  
1,561,146  
BALANCED ELECTROSTATIC PHASE CONVERTER  
Filed Feb. 5, 1921
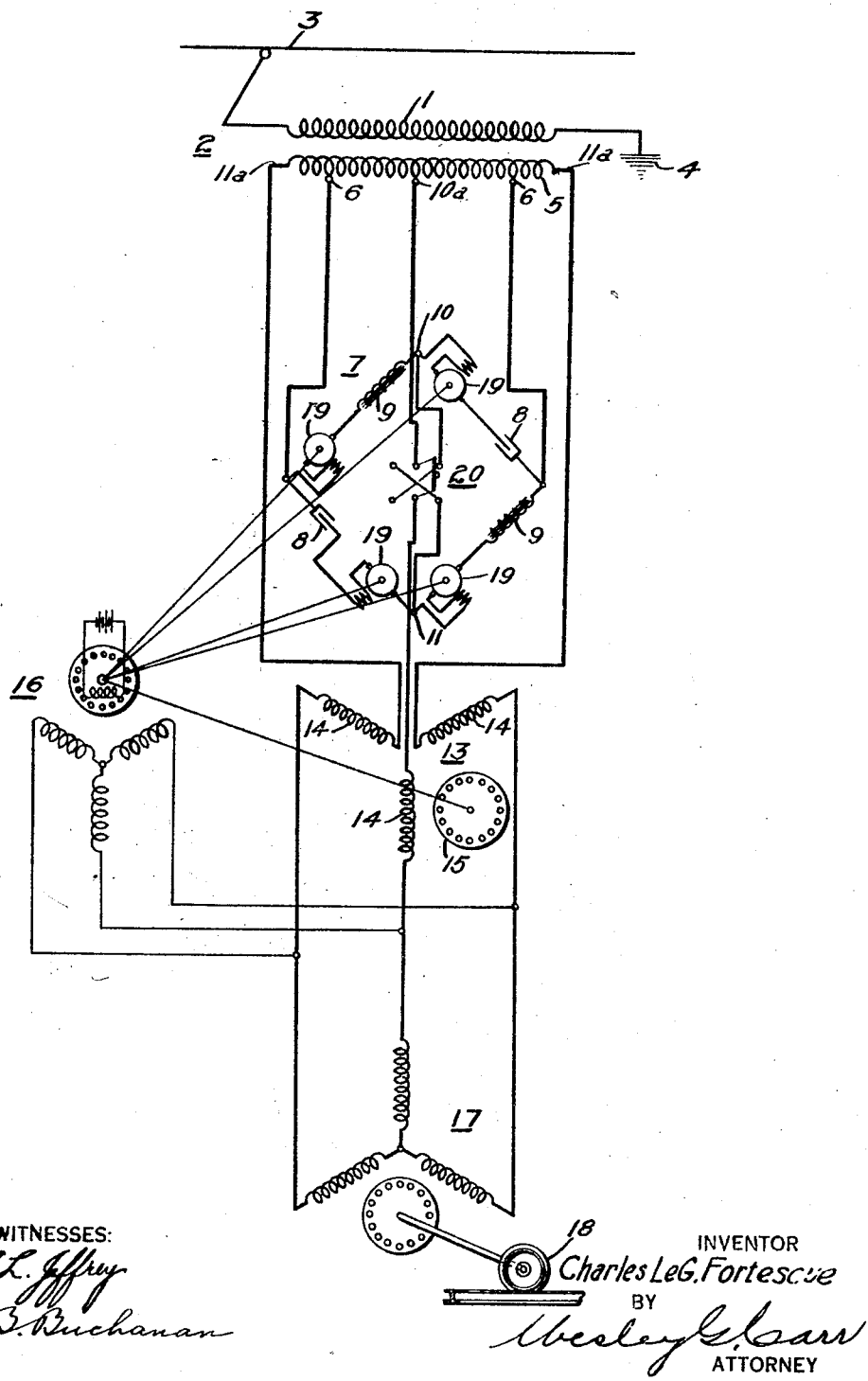
WITNESSES:  
A. L. Jeffrey  
O. B. Buchanan
INVENTOR  
Charles LeG. Fortescue  
BY  
Wesley G. Carr  
ATTORNEY Patented Nov. 10, 1925.

1,561,146

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

BALANCED ELECTROSTATIC PHASE CONVERTER.

Application filed February 5, 1921. Serial No. 442,765.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Balanced Electrostatic Phase Converters, of which the following is a specification.

My invention relates to balanced electrostatic phase converters and particularly to means for obviating the necessity for changing the adjustment of an electrostatic phase converter with varying loads.

In any static network, such as a bridge comprising four reactance elements connected together in a square, with the two phases taken off the diagonals of the square, it is necessary to change the constants of the electrostatic network with changes in the load, in order to maintain balanced conditions, as pointed out, for example, in my Patent No. 1,284,294, granted November 12, 1918.

When the polyphase power is supplied to polyphase dynamo-electric machines, such as railway motors, it is very essential that the balance be maintained as perfect as possible, owing to the fact that a very small voltage unbalance causes a very large current unbalance, that seriously curtails the permissible load which may be carried by the motors.

According to my invention, I propose to employ a static network for converting single-phase power into polyphase power, and to avoid the necessity for adjusting the constants of the network, with changes in the load, by employing a series balancer such as that shown in my Patent No. 1,480,710, dated Jan. 15, 1924. The series balancer is merely a polyphase induction machine, designed with a particularly good damper winding, having its primary member connected in series with the respective phases of the polyphase line and having its secondary member rotating backwardly at synchronous speed. The function of the series balancer is to permit the passage of only balanced currents of positive phase-sequence.

A further object of my invention is to secure perfect phase conversion by means of negative-resistance generators for supplying the losses of the various reactive elements of the electrostatic phase converter. Said negative-resistance generators per se constitute the subject-matter of my application, Serial No. 198,278, filed Oct. 24, 1917.

The single view of the drawing is a diagrammatic view of apparatus and circuits embodying my invention in one of its preferred forms. I show a primary winding 1 of a transformer 2 energized from a trolley wire 3 and ground 4. The secondary winding 5 of the transformer is provided with taps 6 for supplying the primary phase of an electrostatic phase converter 7.

I have shown the converter 7 as a static network comprising condensers 8, 8 and reactance elements 9, 9, in accordance with the disclosure in my aforesaid Patent No. 1,284,294. One terminal 10 of the secondary phase of the electrostatic network is connected to a midtap 10a of the secondary winding 5, and the other terminal 11 is connected to one phase of the load, in such manner as to form the well-known Scott connection. The other phase of the load may be connected to the taps 6, 6, or may be supplied with a higher voltage from the terminals 11a, 11a of the transformer secondary, as shown in the drawing.

In an electrostatic converter network, where the elements are not adjustable, the polyphase electromotive forces will become unbalanced if the load varies. In order to overcome this unbalance without resorting to complicated adjustments, I employ a series balancer 13, comprising primary windings 14 connected in series with the respective phases of the polyphase lines, and a secondary member 15 which rotates backwardly at substantially synchronous speed.

The rotor 15 of the series balancer may be driven by any suitable means, such as a small synchronous motor 16 energized from the polyphase lines. The polyphase load is shown as comprising an induction motor 17, which may be connected to the drive wheels 18 of a locomotive.

During operation of the motor 17, the static network 7 converts the single-phase power into three-phase power for the motor. However, the network 7 can supply balanced polyphase electromotive forces at only one load, as is well known. At all other loads, the polyphase electromotive forces are unbalanced, and there is, consequently, a tendency for the polyphase-current flow to be unbalanced.

It is well-known that an unbalanced polyphase system may be resolved into two balanced component systems of opposite phase-sequences. The series machine 13 operates as a synchronous machine, running light, on the negative-phase-sequence-component currents, since the rotor 15 of said series balancer is rotating in the same direction as the primary field set up by said negative-phase-sequence-component currents. Hence, the machine offers selectively a "synchronous" impedance to negative-phase-sequence-component currents, while permitting the substantially unimpeded flow of positive-phase-sequence currents.

In order to improve further the operation of the phase converter 7, and thus lessen the duty of the phase balancer 13, I may employ negative-resistance generators 19 in series with some or all of the elements of the bridge for supplying the ohmic-resistance losses. These negative-resistance generators are shown as series commutator machines driven by the synchronous motor 16. The broad idea of using negative-impedance generators in circuits in general is discussed in my copending application, Serial No. 198,278, hereinbefore mentioned.

In order to avoid exceeding the rating otherwise required for the auxiliary series balancer, during regenerative operation of the motor 17, I provide a pole-changing switch 20 for reversing the secondary terminals of the static network. By this means, the same bridge may be used for motoring as for regenerating without changing the values of the reactances.

By the term "static network", I mean to include any system of resistances, capacities and inductances. These elements may be all static elements, or the impedance of any element may be supplied by means of rotating dynamo-electric machines, provided that no polyphase dynamo-electric machine is employed.

While I have illustrated my invention in its preferred form, it is to be understood that it is susceptible of various modifications by those skilled in the art, and the claims are to be construed to cover all such modifications, except where limited by the prior art.

I claim as my invention:

1. The combination with a polyphase motor and a static network for supplying said motor with energy, of means for automatically equalizing the polyphase currents flowing between said motor and said static network, and means for reversing said static network during regenerative operation of said motor.

2. The combination with a single-phase system, and a polyphase system, of a static network comprising fixed reactances interconnecting said systems for interchange of energy, and means for opposing the flow of unbalancing polyphase component currents through said static network, whereby the polyphase currents flowing therethrough are substantially balanced under all conditions, and means for reversing the static network connections.

3. The combination with a polyphase motor and a static network comprising fixed reactances for supplying said motor with energy, of means for opposing the flow of unbalancing polyphase component currents through said static network, whereby the polyphase currents flowing therethrough are substantially balanced under all conditions, and means for reversing said static network during regenerative operation of said motor.

4. The combination with a balanced system and an unbalanced system, of interconnecting means for delivering balanced currents from one system to the other, said interconnecting means comprising a static network of inductance and capacitance devices of such reactances as to transmit balanced currents at one predetermined load condition only, said inductance and capacitance devices being fixed in value regardless of the interconnected load, and a serially connected, inherently operating, dynamo-electric phase balancer for compensating for the departure from balanced conditions resulting from a change from said predetermined load.

5. The combination with a polyphase motor and a static network comprising fixed reactances for supplying said motor with energy, of an auxiliary machine operating as a series phase-balancer, said machine having a polyphase primary winding connected in series-circuit relationship with said motor and having a short-circuited secondary winding rotating backwardly at substantially synchronous speed, and means for reversing said static network during regenerative operation of said motor.

6. The combination with a single-phase system and a polyphase system, of a static network interconnecting said systems for interchange of power, said static network including reactance elements and means associated with said elements for supplying the ohmic resistance losses thereof, and a series balancer for automatically equalizing the polyphase currents flowing between said static network and said polyphase system.

7. The combination with a single-phase system and a three-phase system, of a static network comprising fixed reactances interconnecting said systems for interchange of power, said reactances being fixed in value regardless of the current-flow and inherently transmitting balanced currents at only one predetermined load, and serially connected means inherently operating to compensate for the departure from balanced conditions in the three-phase currents flowing between said three-phase system and said static network.

8. The combination with a single-phase translating device comprising a coil having a plurality of taps, of a three-phase translating device, conductors connecting two phase conductors of said three-phase device with the respective terminals of said single-phase device, a static network having one of its phases connected between a midtap of said single-phase coil and the third phase conductor of said three-phase device, said static network having its other phase connected to intermediate taps of said single-phase coil, and means for selectively impeding any balanced negative-phase-sequence currents tending to flow in said three-phase device.

In testimony whereof, I have hereunto subscribed my name this first day of February 1921.

CHARLES LE G. FORTESCUE.